(12) United States Patent
Cai et al.

(10) Patent No.: US 9,805,618 B2
(45) Date of Patent: Oct. 31, 2017

(54) REAL TIME EVALUATION AND COACHING SYSTEM

(71) Applicant: Caterpillar Inc., Peoria, IL (US)

(72) Inventors: Zhijun Cai, Springfield, IL (US); Bradley Bomer, Pekin, IL (US)

(73) Assignee: Caterpillar Inc., Peoria, IL (US)

( * ) Notice: Subject to any disclaimer, the term of this patent is extended or adjusted under 35 U.S.C. 154(b) by 263 days.

(21) Appl. No.: 14/615,978

(22) Filed: Feb. 6, 2015

(65) Prior Publication Data

US 2016/0232816 A1 Aug. 11, 2016

(51) Int. Cl.
G09B 19/24 (2006.01)
G09B 5/00 (2006.01)
G07C 5/08 (2006.01)
G07C 5/12 (2006.01)

(52) U.S. Cl.
CPC ........... *G09B 19/24* (2013.01); *G07C 5/0808* (2013.01); *G07C 5/12* (2013.01); *G09B 5/00* (2013.01)

(58) Field of Classification Search
CPC ........... E02F 3/43; E02F 3/435; G09B 19/167
See application file for complete search history.

(56) References Cited

U.S. PATENT DOCUMENTS

| | | | |
|---|---|---|---|
| 5,101,627 A * | 4/1992 | Fujii | E02F 9/2292 60/429 |
| 7,424,414 B2 | 9/2008 | Craft | |
| 8,554,468 B1 | 10/2013 | Bullock | |
| 9,000,706 B2 * | 4/2015 | Dontha | H02P 7/00 318/254.1 |
| 9,227,660 B1 * | 1/2016 | Bebernes | B62D 6/02 |
| 9,441,348 B1 * | 9/2016 | Alig | E02F 9/2228 |
| 2005/0246040 A1 * | 11/2005 | Horkavi | G05B 19/0426 700/83 |
| 2007/0192173 A1 * | 8/2007 | Moughler | G06Q 10/06 705/7.21 |
| 2009/0132131 A1 * | 5/2009 | Takeda | B25D 9/145 701/50 |
| 2009/0326768 A1 * | 12/2009 | Shull | E02F 3/431 701/50 |

(Continued)

FOREIGN PATENT DOCUMENTS

GB 2443645 A 5/2008

*Primary Examiner* — Robert J Utama
*Assistant Examiner* — Sadaruz Zaman
(74) *Attorney, Agent, or Firm* — Leydig, Voit & Mayer, Ltd.; Steve D. Lundquist (57) ABSTRACT

A feedback system for a machine operation that includes a first quantitatively measurable task and a second quantitatively measurable task. A controller stores a first threshold for the first quantitatively measurable task, stores a second threshold for the second quantitatively measurable task, determines the first operating characteristic of a first linkage member, compares the first operating characteristic to the first threshold, and generates and displays a first rating for the first quantitatively measurable task. The controller also determines the second operating characteristic of a work implement operatively connected to the first linkage member, compares the second operating characteristic to the second threshold, and generates and displays a second rating for the second quantitatively measurable task based upon the second operating characteristic and the second threshold.

16 Claims, 7 Drawing Sheets

(56) References Cited

U.S. PATENT DOCUMENTS

| | | |
|---|---|---|
| 2010/0184005 A1 | 7/2010 | Eklund et al. |
| 2012/0135382 A1 | 5/2012 | Winston et al. |
| 2014/0067092 A1* | 3/2014 | Cesur .................... E02F 9/2025 700/83 |
| 2015/0047609 A1* | 2/2015 | Kleczewski ........ F02D 41/0097 123/438 |
| 2016/0196762 A1* | 7/2016 | Cai ...................... G09B 19/167 434/62 |
| 2016/0196769 A1* | 7/2016 | Fletcher ............... G09B 19/167 434/65 |
| 2016/0232816 A1* | 8/2016 | Cai ........................ G09B 19/24 |

* cited by examiner

REAL TIME EVALUATION AND COACHING SYSTEM

TECHNICAL FIELD

This disclosure relates generally to an evaluation and coaching system and, more particularly, to a system and method for evaluating and coaching a machine operator in real time with respect to the performance of quantitatively measurable tasks.

BACKGROUND

Machines such as, for example, wheel loaders, track-type tractors, motor graders, dozers, and other mobile machines are used to perform a variety of operations associated with an industry such as mining, farming, construction, transportation, or any other industry. It may take a significant amount of training before an operator may be characterized as an expert or even an intermediate operator.

Machine operators are often trained in computer-based simulators and perform on-machine training exercises prior to performing actual work-related operations. While these methods may provide a basic level of operational exposure, they may not provide an environment that completely prepares the operator for actual "real-world" work experiences associated with a job site. Thus, many inexperienced machine operators may require additional on-the-job training in certain areas associated with machine operation. Additionally, many experienced machine operators may require supplemental training for certain operational skills and/or new techniques associated with one or more machines. Thus, in order to properly train a machine operator while providing exposure to actual job site conditions, a system for accurately evaluating the performance of the machine operator may be desirable.

U.S. Patent Publication No. 2007/0192173 discloses an processor configured to determine an operator performance value for an operator of the machine based on operation data associates with operation of a machine. The processor may also be configured to compare the operator performance value with a benchmark value. The processor may be further configured to provide one or more training tools to the operator if the operator performance value is less than the benchmark value.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a system provides feedback for a machine operation that includes a first quantitatively measurable task and a second quantitatively measurable task. The system includes a first linkage member, a work implement operatively connected to the first linkage member, a first sensor operative to determine a first operating characteristic of the first linkage member, and a second sensor operative to determine a second operating characteristic of the work implement. A controller is configured to store a first threshold for the first quantitatively measurable task, store a second threshold for the second quantitatively measurable task, determine the first operating characteristic of the first linkage member, compare the first operating characteristic to the first threshold, and generate and display a first rating for the first quantitatively measurable task based upon the first operating characteristic and the first threshold. The controller is further configured to determine the second operating characteristic of the work implement, compare the second operating characteristic to the second threshold, and generate and display a second rating for the second quantitatively measurable task based upon the second operating characteristic and the second threshold.

In another aspect, a method of providing feedback for a machine operation, having a first quantitatively measurable task and a second quantitatively measurable task, includes storing a first threshold for the first quantitatively measurable task, storing a second threshold for the second quantitatively measurable task, determining a first operating characteristic of a first linkage member, comparing the first operating characteristic to the first threshold, and generating and displaying a first rating for the first quantitatively measurable task based upon the first operating characteristic and the first threshold. The method further includes determining a second operating characteristic of a work implement operatively connected to the first linkage member, comparing the second operating characteristic to the second threshold, and generating and displaying a second rating for the second quantitatively measurable task based upon the second operating characteristic and the second threshold.

In still another aspect, a machine includes a propulsion system for moving the machine, a first linkage member, and a work implement operatively connected to the first linkage member for performing a machine operation wherein the machine operation includes a first quantitatively measurable task and a second quantitatively measurable task. A first sensor is operative to determine a first operating characteristic of the first linkage member and a second sensor is operative to determine a second operating characteristic of the work implement. A controller is configured to store a first threshold for the first quantitatively measurable task, store a second threshold for the second quantitatively measurable task, determine the first operating characteristic of the first linkage member, compare the first operating characteristic to the first threshold, and generate and display a first rating for the first quantitatively measurable task based upon the first operating characteristic and the first threshold. The controller is further configured to determine the second operating characteristic of the work implement, compare the second operating characteristic to the second threshold, and generate and display a second rating for the second quantitatively measurable task based upon the second operating characteristic and the second threshold.

DETAILED DESCRIPTION

Figure 1:
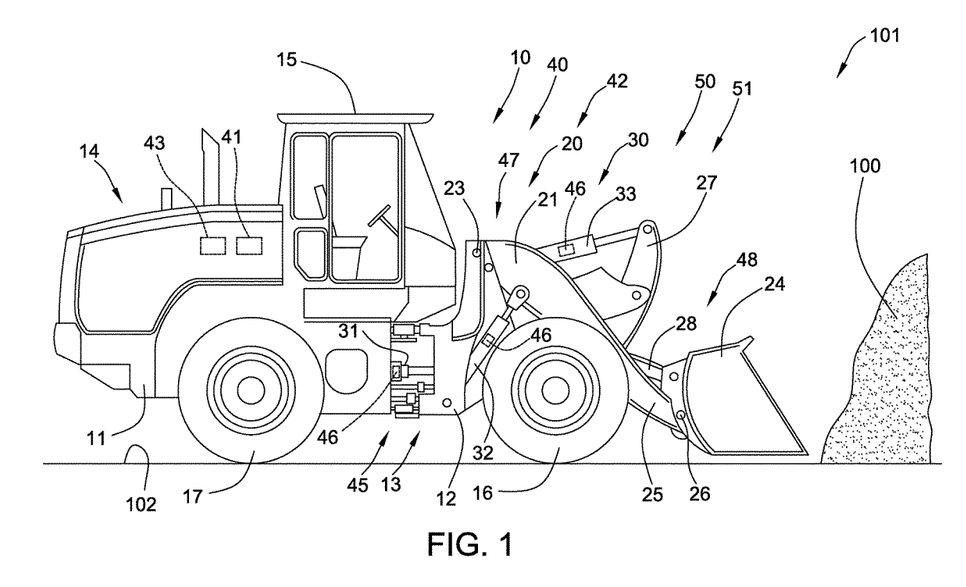
FIG. 1 depicts a schematic illustration of a machine in which the principles disclosed herein may be used.

Referring to FIG. 1, a diagrammatic illustration of a machine 10 such as a wheel loader that may operate to move material 100 about a work site 101 is illustrated. While the machine 10 is depicted as a wheel loader, it is to be understood that the teachings of this disclosure are applicable to many other types of machines. The machine 10 may include a body having a base portion 11 and an implement support portion 12 pivotally mounted on the base portion by an articulating joint 13. The base portion 11 houses a prime mover 14 such as an engine and an operator station or cab 15 in which an operator may be positioned. The prime mover 14 is operatively connected to and drives a ground engaging drive mechanism such as front wheels 16 and rear wheels 17 to operate as a propulsion system. The base portion 11 includes the rear wheels 17 while the implement support portion 12 includes the front wheels 16. The articulating joint 13 permits the implement support portion 12 to pivot or move relative to the base portion 11 for purposes of steering the machine 10.

The implement support portion 12 includes a linkage 20 having one or more lift arms 21 pivotally connected to the implement support portion 12 at first pivot joint 23. A work implement such as bucket 24 may be pivotally mounted at a distal end 25 of the lift arms 21 at a second pivot joint 26. A curl lever 27 may be pivotally mounted on curl lever support member 22 of implement support portion 12 with a first end (not shown) connected to a curl link member 28 that is pivotally connected to bucket 24. With this configuration, rotation of the curl lever 27 results in curling or tilting of the bucket 24 about the second pivot joint 26.

The machine 10 may include a system such as an electro-hydraulic system generally indicated at 30 for operating various systems and components of the machine. A pair of steering cylinders 31 (only one being visible in FIG. 1) extends between the base portion 11 and the implement support portion 12 and operate to control the movement of the implement support portion relative to the base portion about the articulating joint 13 to control the steering of the machine 10. A pair of lift cylinders 32 (only one being visible in FIG. 1) may operatively extend between the implement support portion 12 to the lift arms 21 to facilitate raising and lowering of the lift arms about first pivot joint 23. A curl cylinder 33 may operatively extend between the implement support portion 12 and the curl lever 27 to facilitate rotation or tilting of the bucket 24 about second pivot joint 26. The steering cylinders 31, the lift cylinders 32, and the curl cylinder 33 may be electro-hydraulic cylinders or any other type of desired cylinders.

Figure 2:
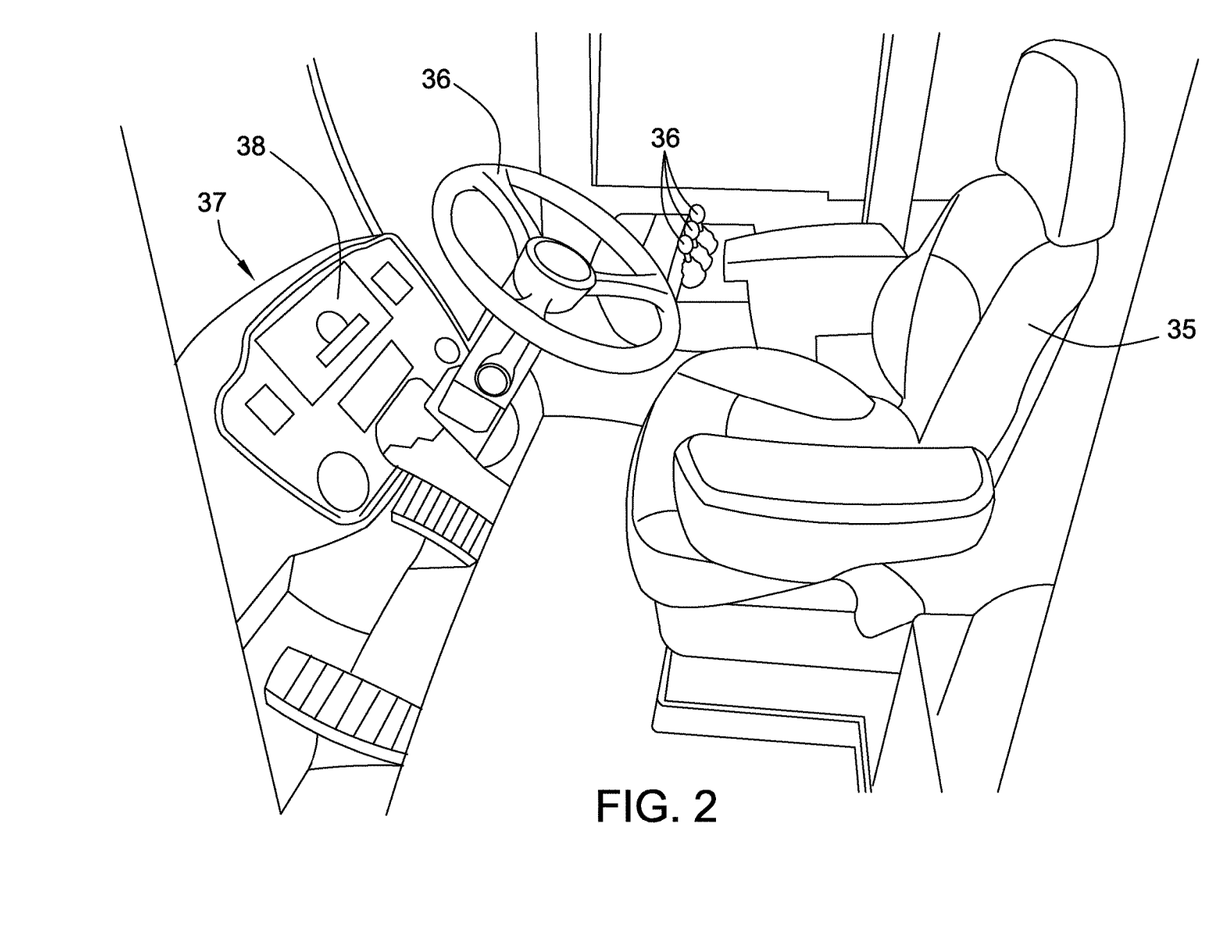
FIG. 2 depicts a perspective view of a cab of the machine of FIG. 1.

Referring to FIG. 2, cab 15 may include an operator seat 35, one or more input devices 36 such as a steering wheel, levers, knobs, buttons, joysticks, etc. through which the operator may issue commands to control the operation of the machine 10 such as the propulsion and steering as well as operate various implements associated with the machine. One or more instrument arrays 37 may be positioned within the cab 15 to provide information to the operator and may further include additional input devices such as knobs and buttons. Cab 15 may further include a visual image display device such as a display screen 38.

Machine 10 may include a control system 40, as shown generally by an arrow in FIG. 1 indicating association with the machine. The control system 40 may utilize one or more sensors to provide data and input signals representative of various operating parameters of the machine 10 and the environment of the work site 101 at which the machine is operating. The control system 40 may include an electronic control module or controller 41 and a plurality of sensors associated with the machine 10.

The controller 41 may be an electronic controller that operates in a logical fashion to perform operations, execute control algorithms, store and retrieve data and other desired operations. The controller 41 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 41 such as power supply circuitry, signal conditioning circuitry, driver circuitry, and other types of circuitry.

The controller 41 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the controller 41 may be implemented in hardware and/or software without regard to the functionality. The controller 41 may rely on one or more data maps relating to the operating conditions and the operating environment of the machine 10 and the work site 101 that may be stored in the memory of controller. Each of these data maps may include a collection of data in the form of tables, graphs, and/or equations.

The control system 40 and controller 41 may be located on the machine 10 or may be distributed with components also located remotely from the machine such as at a command center (not shown). The functionality of control system 40 may be distributed so that certain functions are performed at machine 10 and other functions are performed remotely. In such case, the control system 40 may include a communications system such as wireless network system (not shown) for transmitting signals between the machine 10 and a system located remote from the machine such as at the command center.

Machine 10 may be equipped with a plurality of machine sensors that provide data indicative (directly or indirectly) of various operating parameters of the machine and/or the operating environment in which the machine is operating. The term "sensor" is meant to be used in its broadest sense to include one or more sensors and related components that may be associated with the machine 10 and that may cooperate to sense various functions, operations, and operating characteristics of the machine and/or aspects of the environment in which the machine is operating.

A position sensing system 42, as shown generally by an arrow in FIG. 1 indicating association with the machine 10, may include a position sensor 43, also shown generally by an arrow in FIG. 1 to indicate association with the machine, that is operative to sense the position of the machine relative to the work site 101. The position sensor 43 may include a plurality of individual sensors that cooperate to generate and provide position signals to controller 41 indicative of the position of the machine 10. In one example, the position sensor 43 may include one or more sensors that interact with a positioning system such as a global navigation satellite system or a global positioning system to operate as a position sensor. The controller 41 may use position signals from the position sensor 43 to determine the position of the machine 10 within work site 101. In other examples, the position sensor 43 may include an odometer or another wheel rotation sensing sensor, a perception based system, or may use other systems such as lasers, sonar, or radar to determine all or some aspects of the position of machine 10.

An articulating joint position sensor 45, as shown generally by an arrow in FIG. 1, may be provided and is operative to sense the angular position of the implement support portion 12 relative to the base portion 11 as it rotates about the articulating joint 13. In one embodiment, the articulating joint position sensor 45 may be configured as a displacement sensors 46 associated with each of the steering cylinders 31. The displacement sensors 46 may generate and provide displacement signals to controller 41 indicative of the displacement of each of the steering cylinders 31. The controller 41 may analyze the displacement signals from each steering cylinder 31 to determine the displacement of each steering cylinder and then determine the angular orientation of the implement support portion 12 relative to the base portion 11 based upon the relative positions of the steering cylinders.

A lift position sensor 47, as shown generally by an arrow in FIG. 1, may be provided and is operative to sense the angular position of the lift arms 21 relative to the implement support portion 12 as the lift arms rotate about the first pivot joint 23. In one embodiment, the lift position sensor 47 may be configured as a displacement sensor 46 associated with one or more of the lift cylinders 32. The displacement sensors 46 may generate and provide displacement signals to controller 41 indicative of the displacement of the lift cylinders 32. The controller 41 may analyze the displacement signals from the displacement sensors 46 to determine the position of the lift arms 21 based upon the position of the lift cylinders and the dimensions of the lift arms and lift cylinders 32. In other words, based upon the extent to which the lift cylinders 32 are extended, the controller 41 may determine the angle of the lift arms 21 relative to the implement support portion 12.

A curl position sensor 48, as shown generally by an arrow in FIG. 2, may be provided and is operative to sense the angular position of the bucket 24 relative to the lift arms 21 as the bucket rotates about the second pivot joint 26. In one embodiment, the curl position sensor 48 may be configured as a displacement sensor 46 associated with the curl cylinder 33. The displacement sensor 46 may generate and provide displacement signals to controller 41 indicative of the displacement of the curl cylinder 33. The controller 41 may analyze the displacement signals from the displacement sensor 46 to determine the position of the bucket 24 based upon the position of the curl cylinder 33 and the dimensions of the curl lever support member 22, curl lever 27, curl link member 28, and curl cylinder 33. Based upon the extent to which the curl cylinder 33 is extended, the controller 41 may determine the angle of the bucket 24 relative to the lift arms 21.

Other types of sensors such as, for example, rotary potentiometers may be used rather than cylinder displacement sensors to determine the relative angles between the pivotable components (i.e., implement support portion 12 relative to base portion 11, lift arms 21 relative to implement support portion 12, and bucket 24 relative to lift arms 21). Additional sensors may be provided, if desired, to generate signals indicative of the relative angular velocity and angular acceleration between the pivotable components as they rotate about their pivot joints. In an alternate embodiment, controller 41 may be configured to determine the relative angular velocity and angular acceleration based upon the signals from the different position sensors. For example, controller 41 may monitor or determine the rate of change of the relative positions of the components to determine the angular velocity.

Machine 10 may be used to perform many different operations. In many instances, the operator may be performing repetitive operations over an extended period of time. Controller 41 may include a feedback and training system 50 that is operative to analyze an operator's performance and provide feedback to the operator as well as provide instructions or suggestions to improve the operator's performance. To do so, an operation may be segmented or broken into a plurality of quantitatively measurable tasks and each of the tasks measured against a desired threshold. In other words, an operation may be divided into a plurality of tasks that may be evaluated based upon desired positions and speeds of the machine 10 and its various components. The operator's performance for each task as well as the overall operation may be measured and feedback immediately provided to the operator.

As example, a machine 10 configured as a wheel loader may be used to repeatedly dig into a pile of loose material 100 such as gravel or dirt with bucket 24, lift a bucket load of material, and subsequently move the bucket load of material to a desired location such as within a haul truck (not shown). The operation of digging into the pile of material and loading the bucket 24 may be segmented into a plurality of sequential tasks and the efficiency of each task may be measured based upon operating characteristics such as the relative or absolute positions and/or speeds of movement of the machine 10 and its various components (e.g., lift arms 21 and bucket 24). The operating characteristics may be compared to one or more desired thresholds to evaluate or rate the performance of an operator for each task as well as for the entire operation.

Figure 3:
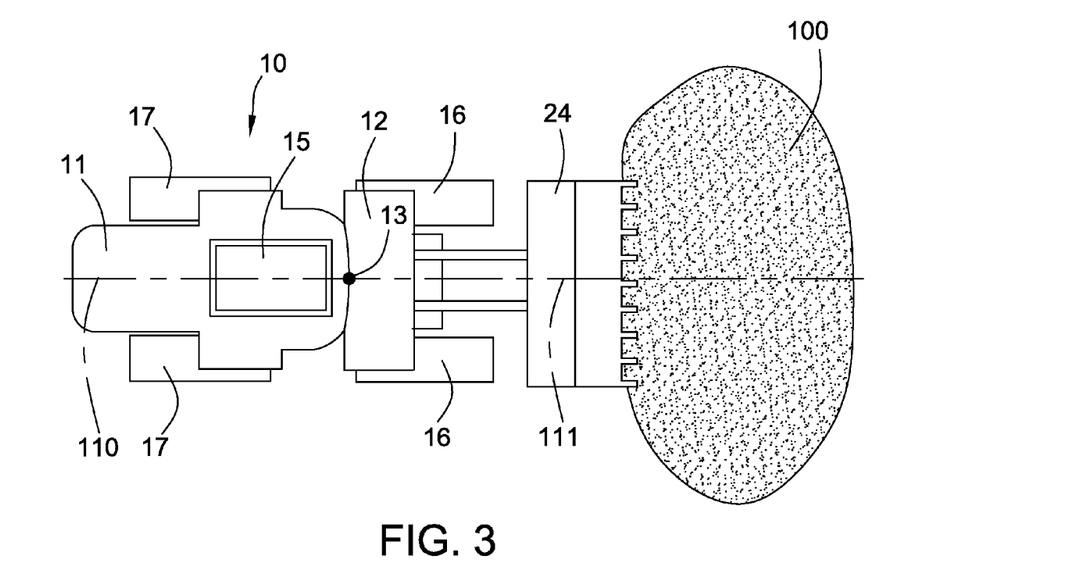
FIG. 3 depicts a simplified illustration of a first quantitatively measurable task being performed properly.
Figure 4:
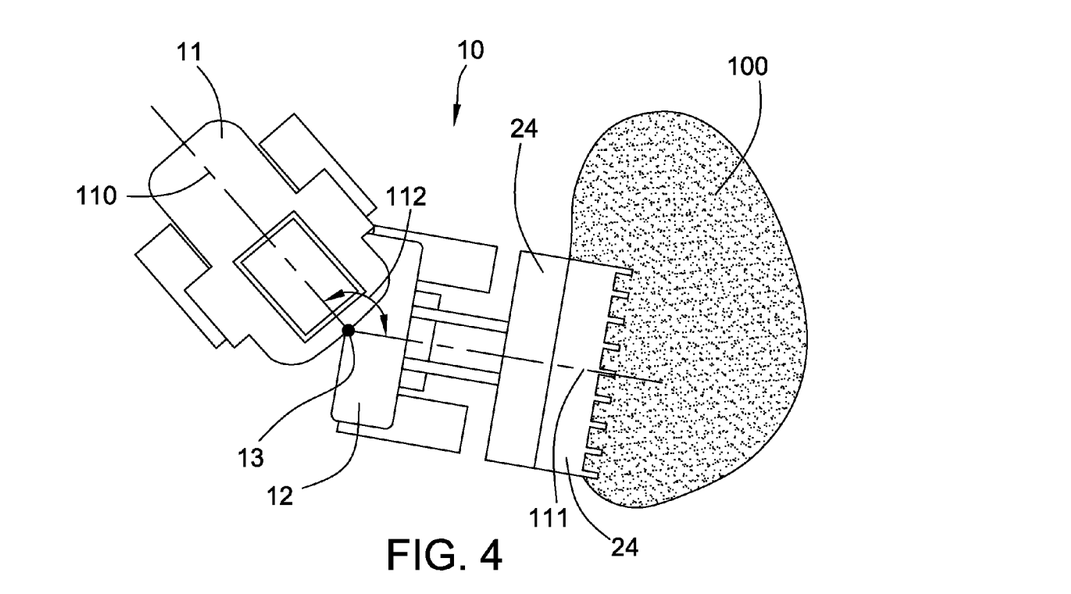
FIG. 4 depicts a simplified illustration of the first quantitatively measurable task of FIG. 3 but with the task being performed poorly.

FIGS. 3-13 depict a series of sequential tasks associated with loading material 100 into bucket 24 that may be quantitatively measured. Referring first to FIGS. 3-4, it is generally desirable for machine 10 to enter a pile of material 100 with the base portion 11 and the implement support portion 12 aligned as depicted in FIG. 3. More specifically, the axis 110 of the base portion 11 and the axis 111 of the implement support portion 12 are co-linear and thus the articulation angle 112 is zero in FIG. 3 but substantially greater than zero in FIG. 4. If the base portion 11 is rotated relative to the implement support portion 12 as depicted in FIG. 4, the bucket 24 will not enter the pile of material 100 as effectively and the wheels are more likely to slip. In addition, the articulating joint 13 and components associated with the relative movement between the base portion 11 and the implement support portion 12 such as steering cylinders 31 may be subjected to additional wear due to the misalignment between the base portion and the implement support portion.

The controller 41 may determine the extent to which the base portion 11 and the implement support portion 12 (i.e., the articulation angle 112) are aligned based upon data from the articulating joint position sensor 45 as described above. One or more thresholds in the form of a maximum desired misalignment or articulation angle 112 may be stored within controller 41. The controller 41 may be configured to compare the actual misalignment between the base portion 11 and the implement support portion 12 (i.e., the articulation angle 112) to one of the thresholds in order to evaluate or measure an operator's performance.

The controller 41 may be configured to evaluate or monitor the articulation angle 112 when the bucket 24 engages the pile of material 100. To determine when the bucket 24 initially engages the pile of material 100, the controller 41 may utilize an implement load sensor system 51 indicated generally in FIG. 1. In one embodiment, the implement load sensor system 51 may embody sensors for measuring changes in the powertrain system such as a change in the difference between output from the prime mover 14 and output from a torque converter (not shown). While approaching the pile of material 100, the engine output speed and the torque converter output speed may be relatively constant. However, upon engaging the pile of material 100, the load on the bucket 24 will be increased thus slowing the machine 10 and causing a change in the relative speeds between the prime mover 14 and the torque converter. Accordingly, by monitoring the difference between the prime mover speed and the torque converter speed, an increase in load on the bucket 24 may be determined that is indicative of engagement of the bucket with the pile of material 100.

Other manners of determining when the bucket 24 is initially engaging the pile of material 100 are contemplated. For example, in alternate embodiments in which the machine propulsion and drivetrain mechanisms are hydrostatic or electric, implement load sensor system 51 may embody other sensors that detect a difference between output from the prime mover and other aspects of the propulsion and drivetrain mechanisms. In another alternate embodiment, the implement load sensor system 51 may utilize one or more pressure sensors (not shown) associated with one or more of the hydraulic cylinders to determine when the load on the bucket 24 initially increases relatively quickly indicating the initial engagement between the bucket and the pile of material 100.

Figure 5:
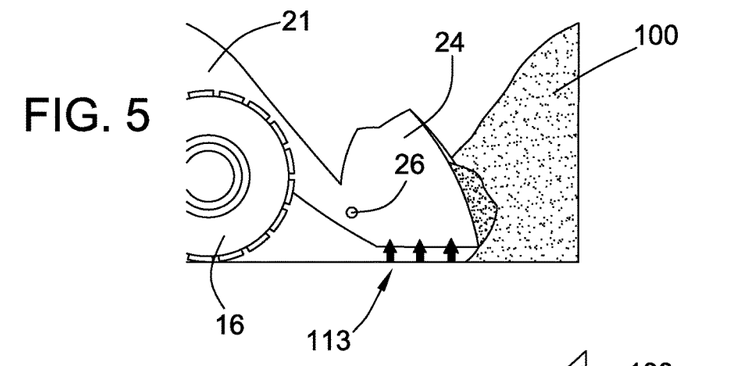
FIG. 5 depicts a simplified illustration of a second quantitatively measurable task being performed properly.

Referring to FIG. 5, another quantitatively measurable task associated with loading bucket 24 is depicted. As the bucket 24 engages the pile of material 100, the load on the bucket will increase substantially causing the machine 10 to slow down rapidly which may cause the front wheels 16 to slip and reduce the machine's ability to propel the bucket 24 into the pile of material. Accordingly, it is typically desirable for an operator to slightly lift the lift arms 21 (and thus bucket 24 also) as the bucket enters the pile of material 100 as depicted at 113 to thus increase the load in the bucket which will increase the tractive force of the front wheels 16. The action of slightly lifting the lift arms 21 is sometimes referred to as "setting the tires" and is desirable as it reduces wheel slip which increases efficiency and reduces tire wear. The increased tractive force also permits the bucket 24 to enter farther into the pile of material 100 and thus may increase the payload that the machine 10 may be able to effectively load into the bucket.

The controller 41 may determine whether an operator has "set the tires" by monitoring the angle of the lift arms 21 relative to the implement support portion 12 as they pivot or rotate about first pivot joint 23 based upon data from the lift position sensor 47 as described above. One or more desired thresholds may be stored within controller 41. The desired thresholds may include the extent to which the lift arms should be raised (e.g., expressed as an angle about first pivot joint 23 or a distance) as well as the timing in which the operation should begin relative to engagement of the pile of material 100 by the bucket 24. The controller 41 may be configured to compare the extent of actual movement of the lift arms 21 relative to the implement support portion 12 and its timing to the desired thresholds in order to evaluate or measure an operator's performance.

The controller 41 may begin evaluating the operator's performance upon determining engagement of the bucket 24 with the pile of material 100 as described above.

Figure 6:
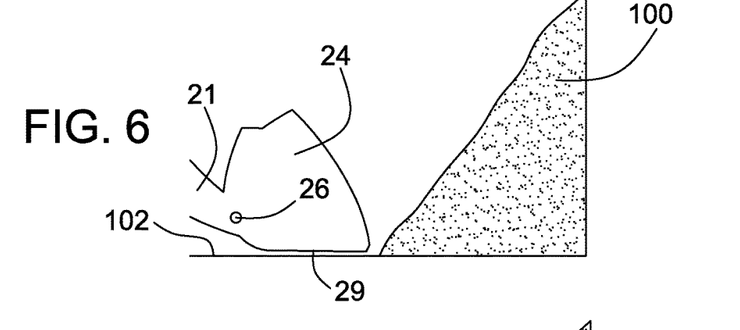
FIG. 6 depicts a simplified illustration of a third quantitatively measurable task being performed properly.

Additional quantitatively measurable tasks may be associated with the physical loading of the bucket 24 as it enters the pile of material 100. For example, it is generally desirable for the bucket 24 to enter the pile of material 100 at a desired angle relative to the ground or the pile of material, and it is generally desirable for the bucket to be curled and the lift arms 21 to be raised in a desired manner to maximize the efficiency of the bucket loading process. More specifically, it is generally desirable for the bucket 24 to enter the pile of material 100 with the lower surface 29 of the bucket generally parallel to the work surface 102 as depicted in FIG. 6. If the bucket 24 is curled upwards about second pivot joint 26, as depicted in a somewhat exaggerated manner in FIG. 7, the bucket will be less likely to effectively penetrate the pile of material 100 and may slide up the pile rather than dig into the pile which is likely to result in an under-filled bucket.

The controller 41 may determine the angle 114 (FIG. 7) of the bucket 24 as it enters the pile of material 100 relative to the work surface 102 based upon data from the position sensor 43 and the curl position sensor 48. The controller 41 may be configured to compare the actual angle 114 of the bucket 24 relative to the desired threshold in order to rate the performance of the operator. While the lower surface 29 of the bucket 24 would be generally parallel to the work surface 102 as depicted in FIG. 6 in an ideal operation, the threshold may be stored as an angle greater than zero.

Figure 7:
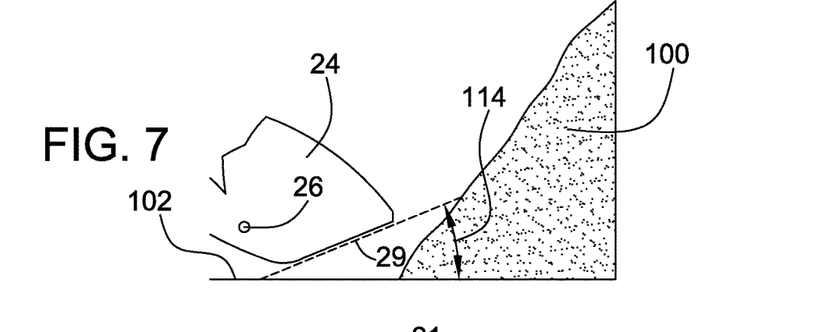
FIG. 7 depicts a simplified illustration of the third quantitatively measurable task of FIG. 6 but with the task being performed poorly.

The controller 41 may begin evaluating the operator's performance upon determining engagement of the bucket 24 with the pile of material 100 as described above.

Additional quantitatively measurable tasks may also be associated with the specific manner in which the bucket 24 is loaded. When loading bucket 24, it is generally desirable for the machine to move forward with the bucket beginning to penetrate the pile of material 100 and then slightly curling the bucket or rotating it upward about second pivot joint 26 as depicted by arrow 115 in FIG. 8 by actuating curl cylinder 33. The process is repeated by alternatingly moving the machine 10 slightly forward farther into the pile of material and then slightly curling the bucket an additional amount so that additional material will be gathered into the bucket. The process may be continued until the bucket is completely filled.

Figure 8:
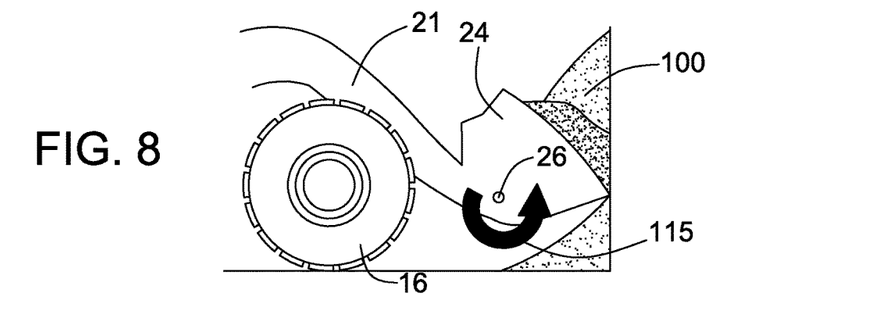
FIG. 8 depicts a simplified illustration of a fourth quantitatively measurable task being performed properly.

In one example, poor or inefficient filling of the bucket 24 will occur if the bucket is curled too quickly about second pivot point 26 as the bucket engages the pile of material 100.

Figure 9:
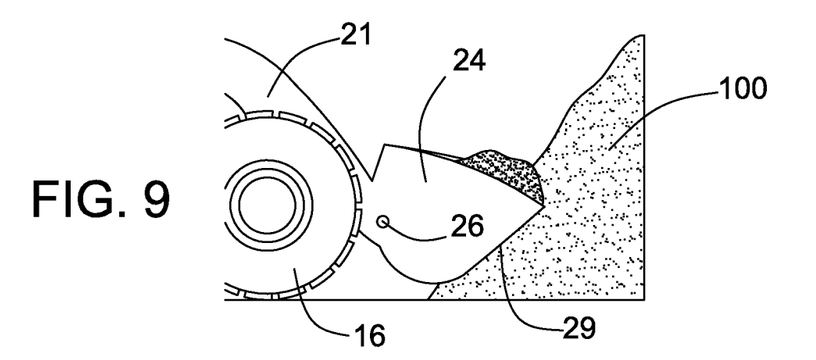
FIG. 9 depicts a simplified illustration of the fourth quantitatively measurable task of FIG. 8 but with the task being performed poorly.

When curling the bucket 24 too quickly, the angle of the bucket will be pointed somewhat upward so that the bucket does not effectively dig into the pile of material 100 as depicted in FIG. 9 as the machine 10 moves into the pile of material 100, resulting in the bucket being only partially filled.

The controller 41 may determine whether an operator has curled the bucket 24 too quickly based upon data from the curl position sensor 48, which may be used to determine the actual position of the bucket or the rate at which the bucket is rotating, as well as based upon data from the position sensor 43 as the machine 10 moves forward into the pile of material 100.

The controller 41 may begin evaluating the operator's performance upon determining engagement of the bucket 24 with the pile of material 100 as described above. In one embodiment, the desired threshold set or stored within the controller 41 may include a desired amount of rotation of the bucket 24 based upon the distance that the machine 10 has moved once it has entered the pile of material 100. In another embodiment, the controller 41 may compare the rate at which the bucket 24 is rotating to a desired threshold.

Figure 10:
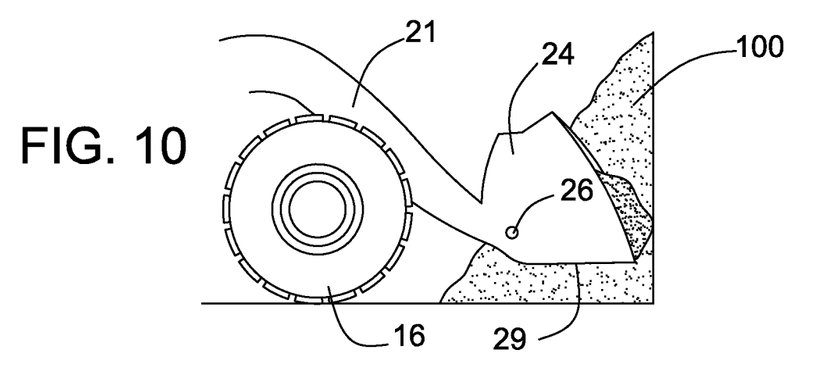
FIG. 10 depicts a simplified illustration of a fifth quantitatively measurable task being performed poorly.
Figure 11:
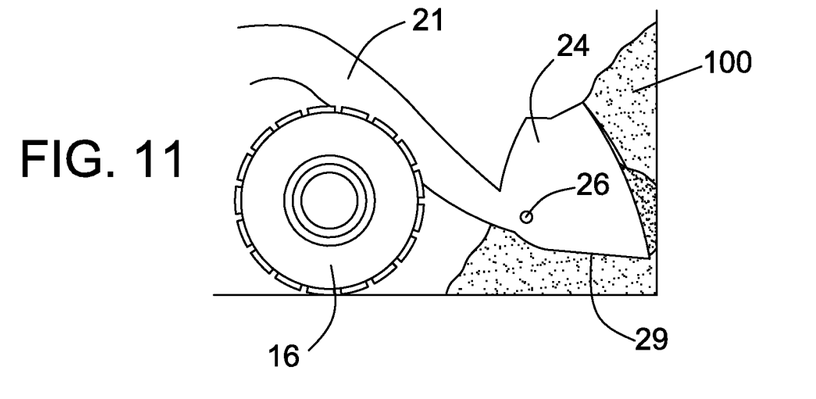
FIG. 11 depicts a further simplified illustration of the fifth quantitatively measurable task being performed poorly.

In another example, poor or inefficient filling of the bucket 24 will occur if the bucket is curled and uncurled or "pumped" as the bucket is moved into the pile of material 100 as depicted in FIGS. 10-11. Pumping of the bucket 24 may occur when the operator causes the bucket to enter the pile of material 100 at a proper angle (FIG. 10), curls the bucket to partially load the bucket, and then uncurls the bucket (FIG. 11) to change the angle of the bucket so that it more easily enters the pile of material 100. By way of example, the lower surface 29 of bucket 24 is angled downward in FIG. 11. The operator may repeat this action as the machine 10 moves forward into the pile of material 100 to fully load the bucket 24. Pumping the bucket 24 is generally undesirable because it increases the time necessary to fill the bucket, it reduces loading on the front wheels 16 and therefore may cause tire slip, it increases the stress on the joints of the machine 10, and it may be harmful or hazardous to an operator.

The controller 41 may determine whether an operator is pumping the bucket 24 based upon data from the curl position sensor 48 as well as based upon data from the position sensor 43 as the machine 10 moves forward into the pile of material 100. The controller 41 may begin evaluating the operator's performance upon engagement of the bucket 24 with the pile of material 100. The controller 41 may monitor the angle of the bucket 24 relative to the lift arms 21 and compare the amount or angle of uncurling of the bucket about second pivot joint 26, if any, to a threshold angle. In one embodiment, a single act of uncurling of the bucket 24 by more than a threshold angle may be unacceptable. In another embodiment, multiple events of uncurling of the bucket 24 by more than a threshold angle as the machine 10 moves forward into the pile of material 100 may be unacceptable.

In still another example, poor or inefficient filling of the bucket 24 will occur if the operator uses the lift arms 21 as a significant part of the bucket filling process rather than utilizing the curl cylinder 33 and the forward movement of the machine 10. When improperly using the lift arms 21, the operator may significantly raise the lift arms while only minimally curling the bucket 24. Excessive use of the lift arms 21 during the bucket loading process is generally undesirable as it will increase the time required to fill the bucket 24, may cause tire slip, and may cause the machine 10 to climb up the pile of material 100 which may damage the tires and put the machine in an unstable position.

The controller 41 may determine whether an operator is loading the bucket 24 using the lift arms 21 based upon data from the lift position sensor 47 as well as based upon data from the position sensor 43 as the machine 10 moves forward into the pile of material 100. The controller 41 may begin evaluating the operator's performance upon engagement of the bucket 24 with the pile of material 100 and terminate the analysis once the machine 10 begins moving in reverse away from the pile of material. The controller 41 may monitor the angle of the lift arms 21 relative to the implement support portion 12 and compare movement of the lift arms about first pivot joint 23 to a threshold angle or amount of movement. In one embodiment, the controller 41 may be configured so that the lift arms 21 are only to be used while setting the tires as described above. In another embodiment, raising the lift arms 21 more than a threshold angle or distance may be unacceptable.

In a further example, poor or inefficient filling of the bucket 24 may occur if the machine 10 is in second gear during the bucket filling process. In other words, it is generally desirable for the machine 10 to be in first gear as the bucket 24 engages the pile of material 100 and the bucket is filled. If the machine 10 is in second gear rather than first gear, the bucket 24 may be less likely to penetrate the pile of material 100 and therefore the bucket may not be filled as desired.

The controller 41 may determine whether the machine is in first gear or has been shifted into a state that will permit it to automatically shift from second gear to first gear based upon the status of an input device associated with the transmission (not shown) of the machine. In one embodiment, the controller 41 may begin evaluating the status of the transmission upon engagement of the bucket 24 with the pile of material 100. In another embodiment, it may be desirable for the operator to shift the transmission into first gear or into an auto-shift mode a predetermined time or distance before the bucket 24 engages the pile of material 100. In such case, the controller may 41 monitor the status of the transmission and compare the time of shifting to the time that the bucket 24 engages the pile of material to determine whether a shift was made within or outside the desired threshold.

As described above, a plurality of quantitatively measurable tasks may be performed as part of an operation to load a bucket 24 with material. The efficiency of the operation may be determined by evaluating whether the tasks are being performed within the desired thresholds. The controller 41 may be configured to store different thresholds for each task based upon an assigned skill level for an operator. More specifically, each operator may be assigned a skill level such as beginner, intermediate, or expert. While an expert may be expected to perform each of the quantitatively measurable tasks in a relatively efficient manner, thus resulting in an efficient bucket loading operation, the thresholds for a beginner may be substantially greater in order to provide goals that may be more achievable for the beginner. The thresholds for an intermediate operator would generally fall between those of a beginner and those of an expert. The thresholds and the characterization of each operator may be set by management personnel or other personnel and may be set or stored within controller 41.

The controller 41 may analyze the quantitatively measurable tasks that make up an operation in order to rate the quality of the entire operation. In an example in which an operation includes six tasks, if no more than two tasks exceed the desired thresholds, the bucket loading process may be characterized as good; if no more than 4 tasks exceed the desired thresholds, the bucket loading process may be characterized as fair; and if more than 4 tasks exceed the desired thresholds, the bucket loading process may be characterized as poor.

Figure 12:
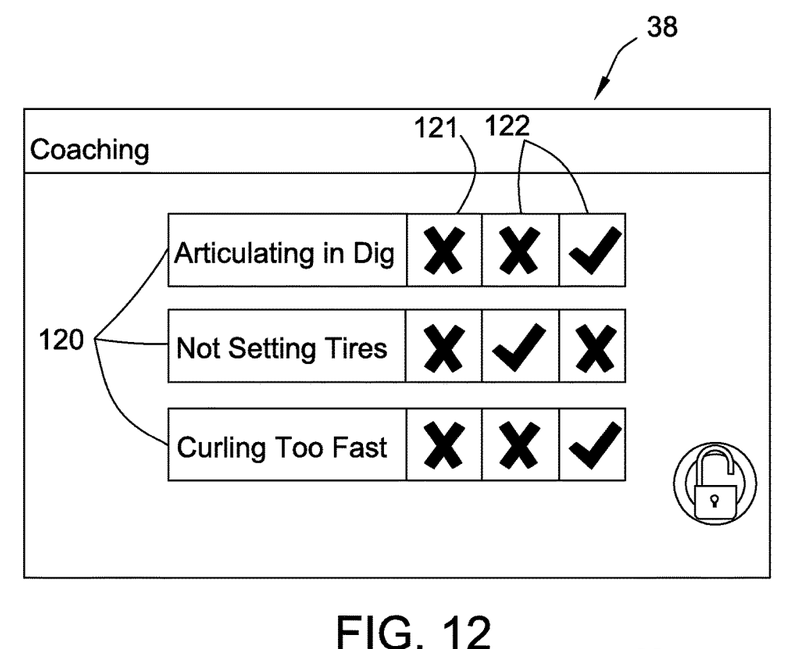
FIG. 12 depicts an example of evaluation images displayed on a display screen of the machine.

The controller 41 may be configured to display feedback in the form of the results of each task on the display screen 38 within the cab 15. As depicted in FIG. 12, the controller 41 may display on display screen 38 some or all of the tasks 120 immediately after they have been performed together with an evaluation identifier 121 such as a checkmark (" ") designating a task that is within a desired threshold and an "X" designating a task that is outside a desired threshold. If desired, the controller 41 may also display the evaluation identifier of each task for a predetermined number of previous operations as indicated at 122. Further, if desired, the controller 41 may also display a percentage of an operator's passing rate for each task over a longer period of time such as the passing rate over the course of the current shift or an operator's historical passing rate.

Figure 13:
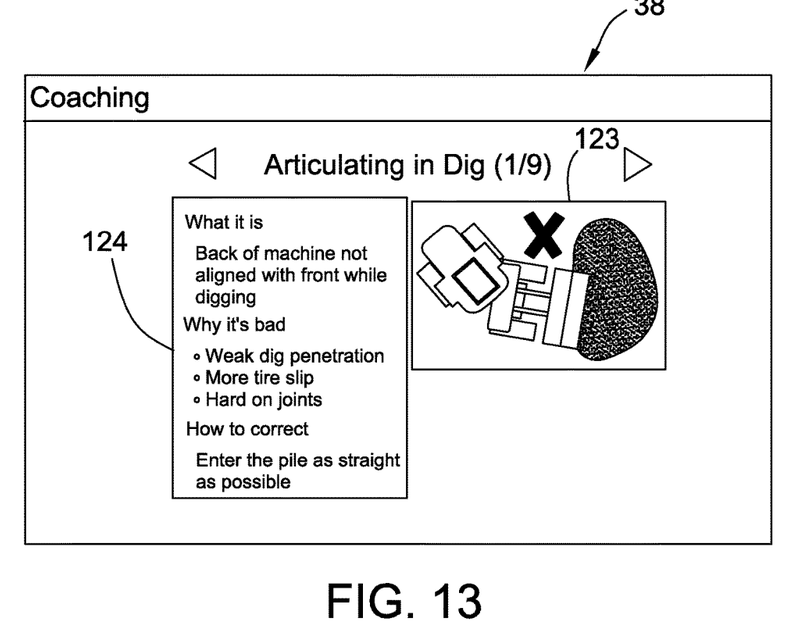
FIG. 13 depicts a view similar to FIG. 12 but instructional images displayed on the display screen.

If desired, the controller 41 may also store instructional materials such as instructional video or animation and written suggestions on how an operator may improve their performance with respect to each task. For example, after performing a series of bucket loading operations or at any other time, an operator may want to view the instructional materials. Upon positioning the machine 10 in a safe location, stopping the machine and applying the brake, the operator may use an input device to view the instructional materials to remind the operator of the desired or optimal manner of performing each task that makes up an operation. An example of an animation 123 and written suggestions 124 are depicted in FIG. 13.

It should be noted that in some instances, it may be acceptable for an operator to disregard the desired or optimal manner of performing a task. For example, in some instances, the conditions at the work site 101 may prevent an operator from aligning the implement support portion 12 with the base portion 11 when entering the pile of material 100. In such case, the controller 41 may be configured to allow an operator to override the optimal manner of performing a task or the operator may be able to communicate an override request to management personnel.

In another example, an operator may perform a task in a particular manner that is not categorized as optimal but may be acceptable. The controller 41 may be configured to permit an operator to perform the task in the alternate manner provided that the operator performs the task in a consistent manner. In one example, the controller 41 may be configured to only permit certain levels of operators (such as expert operators) to vary from the desired or optimal manner of performing a task.

Figure 14:
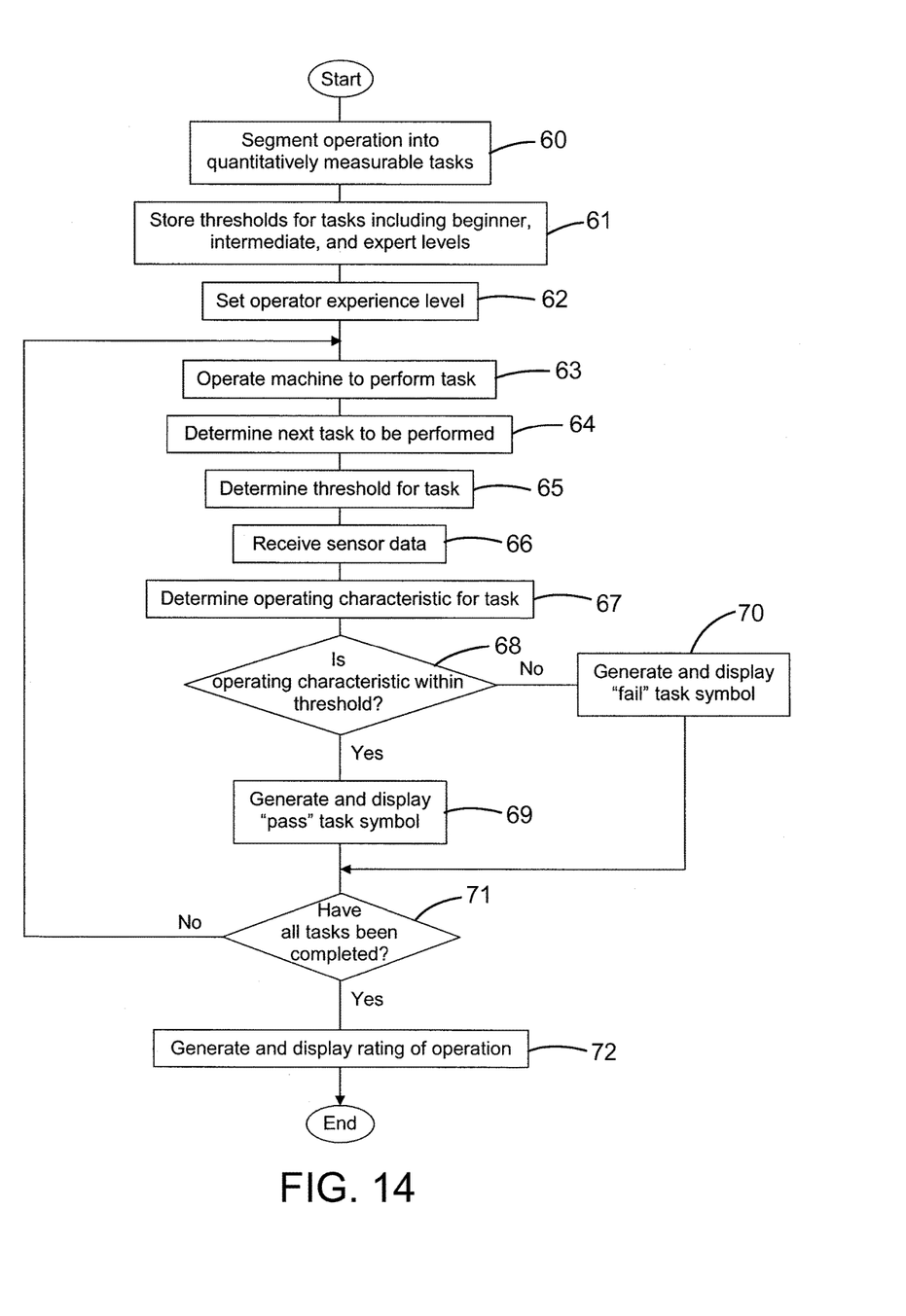
FIG. 14 depicts a flowchart illustrating an evaluation and coaching system used with the machine of FIG. 1.

FIG. 14 illustrates a flowchart of the operation of the feedback and training system 50 for evaluating or rating the performance of an operation. At stage 60, an operation may be segmented or broken into a plurality of quantitatively measurable tasks and the tasks stored within controller 41. One or more thresholds for each task may be stored within controller 41 at stage 61. In one example, a different threshold for each task may be applicable to beginner, intermediate, and expert operators. Other manners of distinguishing operators, such as with numerical or grade level systems, are contemplated. In other words, a plurality of sets of thresholds may be created and stored within the controller 41 with one set designated for each operator skill level. In general, the thresholds for a beginner or inexperienced operator will be less strict or have a greater margin of error as compared to those for an expert operator. However, in some instances, some of the thresholds may be the same for different operator skill levels. Still further, in some instances, the system may be operated without designating different skill levels and different thresholds corresponding to the different skill levels.

The skill level of the operator may be set or stored within controller 41 at stage 62. The skill level may be set by management personnel, the operator, or any other desired person. Setting the operator's skill level may be used to establish which set of thresholds will be used by the controller 41 when evaluating the operator's performance.

At stage 63, the operator may begin operating the machine 10 to perform the tasks necessary to complete the desired operation. The controller 41 may determine the task being performed at stage 64 based upon the previously performed task or may determine that the task to be performed is the first task when beginning an operation. Upon determining the task being performed, the controller 41 may determine at stage 65 the threshold for the particular task based upon the operator's skill level.

The controller may receive at stage 66 data from the sensors of the machine 10. At stage 67, the controller 41 may determine the operating characteristic or characteristics for the task being performed. For example, if the machine 10 is beginning a bucket loading process as described above with respect to FIGS. 3-4, the controller 41 may determine the articulation angle 112 between the base portion 11 and the implement support portion 12. At decision stage 68, the controller 41 may compare the relevant operating characteristics to the applicable threshold to determine whether the performance of the task met the threshold (i.e., was properly performed). If the operating characteristics met the threshold, a pass symbol may be generated and displayed at stage 69 on the display screen 38 adjacent the description of the task. If the operating characteristics did not meet the threshold, a fail symbol may be generated and displayed at stage 70 on the display screen 38.

At stage 71, the controller 41 may determine whether the completed task was the last task of the operation. If the completed task was not the last task of the operation, the operation has not been completed and the operator may continue to perform tasks to complete the operation and stages 63-70 repeated. If the completed task was the last task of the operation, the controller 41 may analyze the performance of the tasks performed while completing the operation and generate a rating for the performance of the operation. In some instances, the performance rating may include designations "good," "fair," and "poor" depending upon the number of tasks that were completed and the rating for each task.

INDUSTRIAL APPLICABILITY

The industrial applicability of the system described herein will be readily appreciated from the forgoing discussion. The foregoing discussion is applicable to machines 10 that are operated at a work site 101 to perform various operations that may be segmented into a plurality of quantitatively measurable tasks. Such system may be used at a mining site, a landfill, a quarry, a construction site, a roadwork site, a forest, a farm, or any other area in which machine operation is desired.

Machine operators often perform repetitive operations at a work site 101 such as to move material from one location to another. Some of the operations may be segmented or broken into a plurality of quantitatively measurable tasks. For example, some of the tasks may involve moving a machine 10 or components of the machine (e.g., base portion 11, implement support portion 12, lift arms 21, and/or bucket 24) in a specified manner such as with the components positioned in a desired manner or moving at a desired rate. The performance of an operator may be evaluated by comparing the position and movement of the machine and its components to theoretical or desired positions and movements. Thresholds or margins of error relative to the theoretical or desired positions and movements may be established and tasks that are performed within a desired threshold judged or evaluated as good or passing and performance outside of the thresholds judged as poor or failing. The performance of the individual tasks may then be used to evaluate the overall performance of an operation.

If desired, different thresholds may be set for each task depending on the skill level of an operator. The thresholds may be higher (e.g., a smaller margin of error) for a skilled or expert operator while a novice operator may use lower thresholds (e.g., a greater margin of error).

Immediate feedback may be provided to the operator by displaying a pass/fail grade immediately upon completion of each task and historical feedback may also be displayed if desired. In addition, on-board instructional materials such as video, animations, and suggestions may be displayed so that an operator may receive instruction while in the working environment. This will permit an operator to stop working, receive instructions, and immediately begin attempting to use the instructions without leaving the cab 15.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for providing feedback for a machine operation, the machine operation including a first quantitatively measurable task and a second quantitatively measurable task, comprising:
    a first linkage member;
    a work implement operatively connected to the first linkage member;
    a first sensor operative to determine a first operating characteristic of the first linkage member;
    a second sensor operative to determine a second operating characteristic of the work implement; and
    a controller which to:
    stores a first threshold for the first quantitatively measurable task;
    stores a second threshold for the second quantitatively measurable task, the second quantitatively measurable task being sequential to the first quantitatively measurable task;
    determines the first operating characteristic of the first linkage member;
    compares the first operating characteristic to the first threshold;
    generates and displays a first rating for the first quantitatively measurable task based upon the first operating characteristic and the first threshold;
    determines the second operating characteristic of the work implement;
    compares the second operating characteristic to the second threshold; and
    generates and displays a second rating for the second quantitatively measurable task based upon the second operating characteristic and the second threshold.

2. The system of claim 1, wherein the controller generates and displays an operation rating for the machine operation based upon the first rating of the first quantitatively measurable task and the second rating of the second quantitatively measurable task.

3. The system of claim 1, wherein the controller displays the first rating immediately upon completing the first quantitatively measurable task and displays the second rating immediately upon completing the second quantitatively measurable task.

4. The system of claim 3, wherein the controller displays an operation rating for the machine operation based upon the rating of the first quantitatively measurable task and the rating of the second quantitatively measurable task immediately upon completing the machine operation.

5. The system of claim 1, wherein the first operating characteristic is a position of one of the first linkage member and the work implement.

6. The system of claim 1, wherein the first operating characteristic is an angular velocity of one of the first linkage member and the work implement.

7. The system of claim 1, wherein the controller stores a first set of thresholds and a second set of thresholds, the first set of thresholds corresponding to a first operator skill level and the second set of thresholds corresponding to a second operator skill level.

8. The system of claim 7, wherein the first set of thresholds includes a first operator first threshold for the first threshold and a first operator second threshold for the second threshold and the second set of thresholds includes a second operator first threshold for the first threshold and a second operator second threshold for the second threshold.

9. The system of claim 8, wherein the first operator first threshold is different from the second operator first threshold and the first operator second threshold is different from the second operator second threshold.

10. The system of claim 7, wherein the first operator skill level corresponds to a novice machine operator and the second operator skill level corresponds to an expert machine operator.

11. The system of claim 1, wherein the controller displays instructional materials corresponding to the first quantitatively measurable task and the second quantitatively measurable task.

12. The system of claim 11, wherein the controller displays the instructional materials on a display screen used to display the first rating and the second rating.

13. The system of claim 1, further including a linkage having the first linkage member and a second linkage member, the first linkage member being pivotable relative to the second linkage member, the work implement being operatively connected to one of the first linkage member and the second linkage member.

14. The system of claim 13, wherein the work implement is pivotally mounted on one of the first linkage member and the second linkage member.

15. The system of claim 13, further including a base portion and an implement support portion pivotally mounted to the base portion, the linkage being pivotally mounted on the implement support portion.

16. A machine comprising:
a propulsion system for moving the machine;
a first linkage member;
a work implement operatively connected to the first linkage member for performing a machine operation, the machine operation including a first quantitatively measurable task and a second quantitatively measurable task;
a first sensor operative to determine a first operating characteristic of the first linkage member;
a second sensor operative to determine a second operating characteristic of the work implement; and
a controller which:
stores a first threshold for the first quantitatively measurable task;
stores a second threshold for the second quantitatively measurable task, the second quantitatively measurable task being sequential to the first quantitatively measurable task;
determines the first operating characteristic of the first linkage member;
compares the first operating characteristic to the first threshold;
generates and displays a first rating for the first quantitatively measurable task based upon the first operating characteristic and the first threshold;
determines the second operating characteristic of the work implement;
compares the second operating characteristic to the second threshold; and
generates and displays a second rating for the second quantitatively measurable task based upon the second operating characteristic and the second threshold.

\* \* \* \* \*